Oct. 26, 1937.          B. LONG          2,097,073
TEMPERED GLASS ARTICLE AND METHOD OF MANUFACTURING THE SAME
Filed June 29, 1935        4 Sheets—Sheet 1
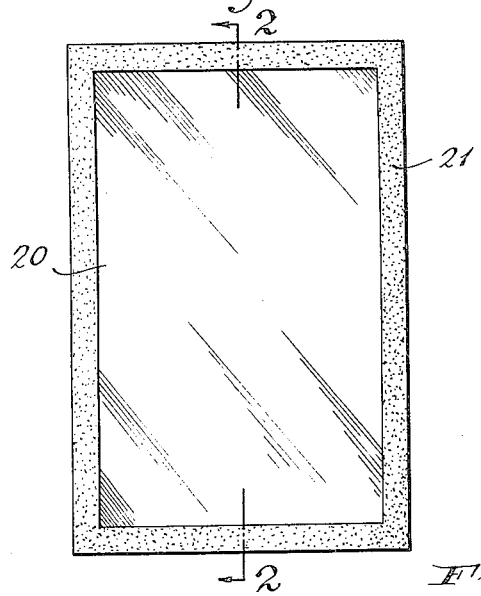
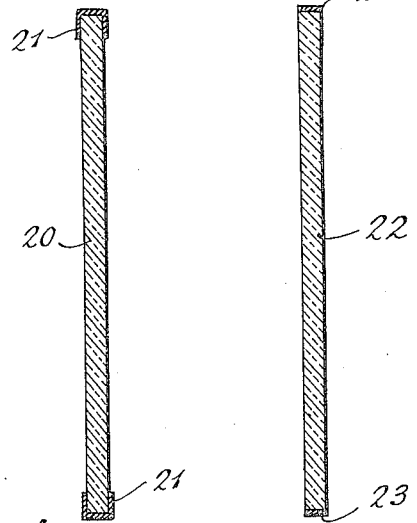
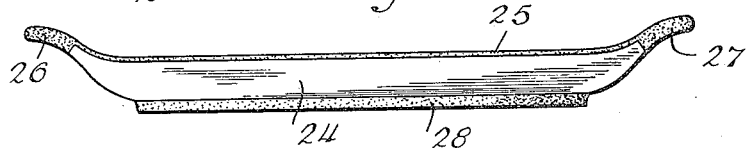
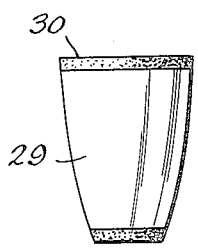
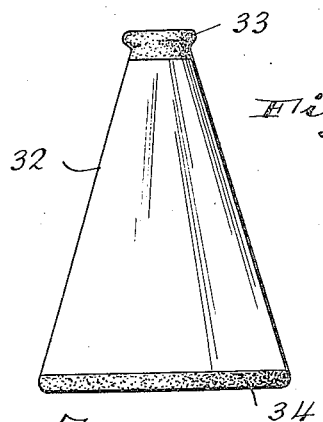
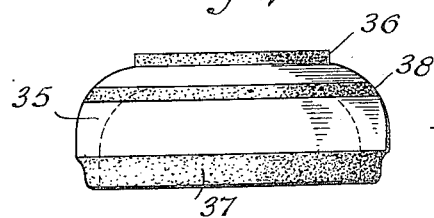
INVENTOR
BERNARD LONG
BY
Richards & Geier
ATTORNEYS Oct. 26, 1937. B. LONG 2,097,073
TEMPERED GLASS ARTICLE AND METHOD OF MANUFACTURING THE SAME
Filed June 29, 1935 4 Sheets-Sheet 2
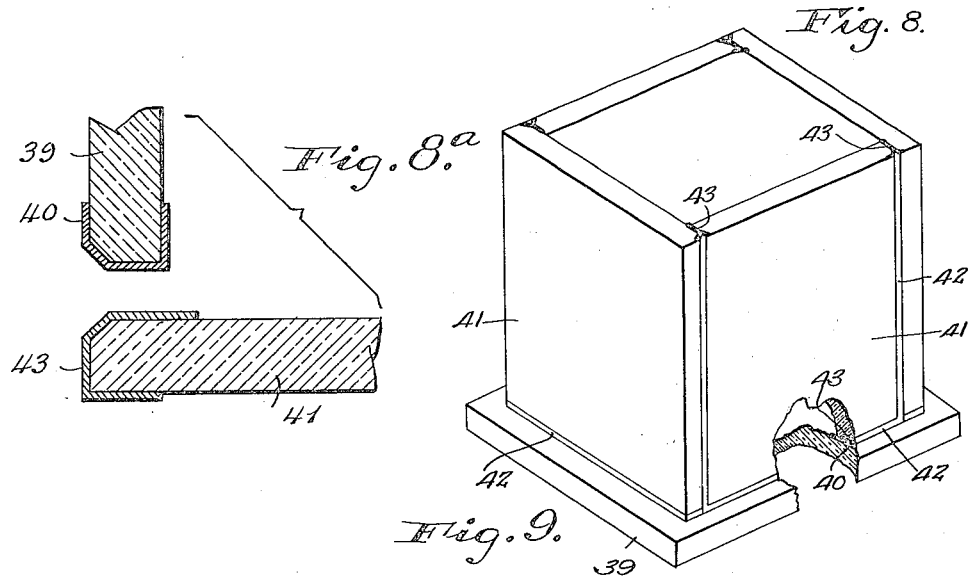
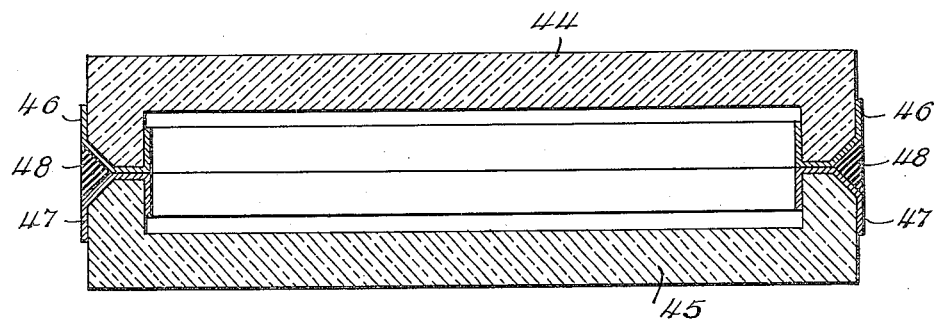
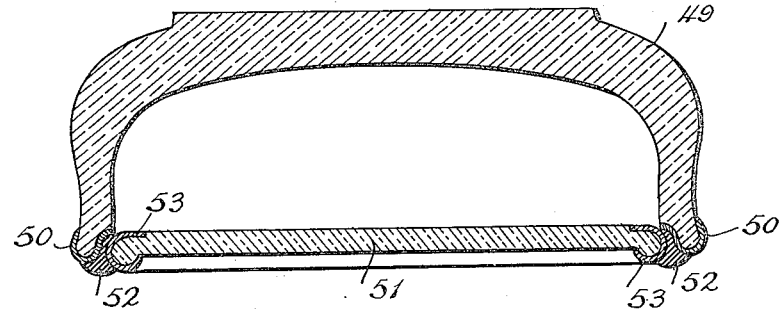
INVENTOR
BERNARD LONG
BY
ATTORNEYS

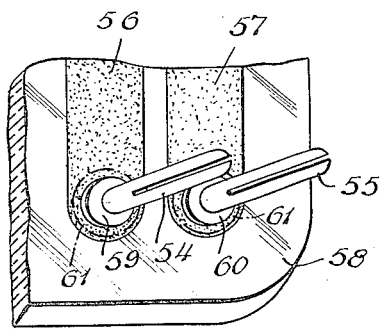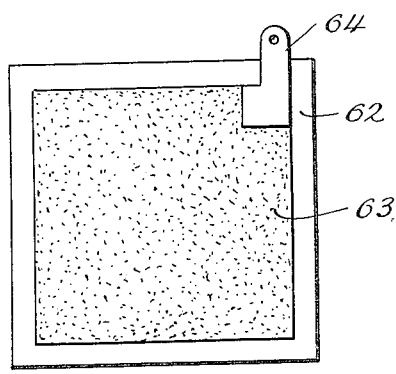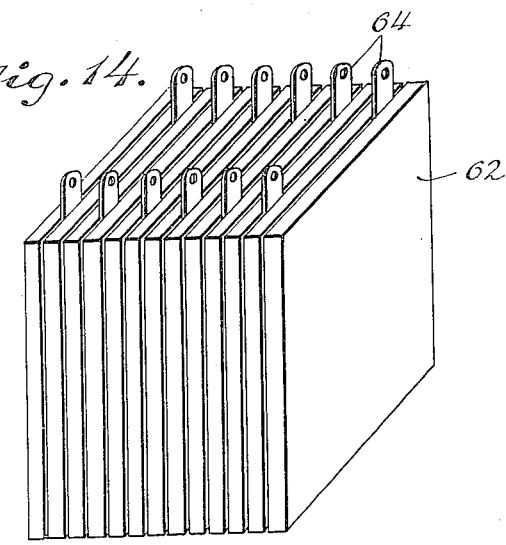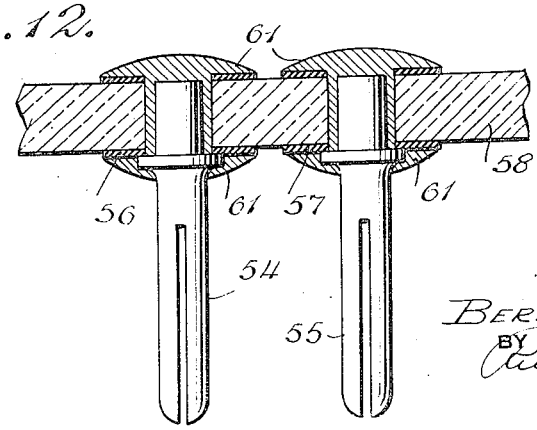

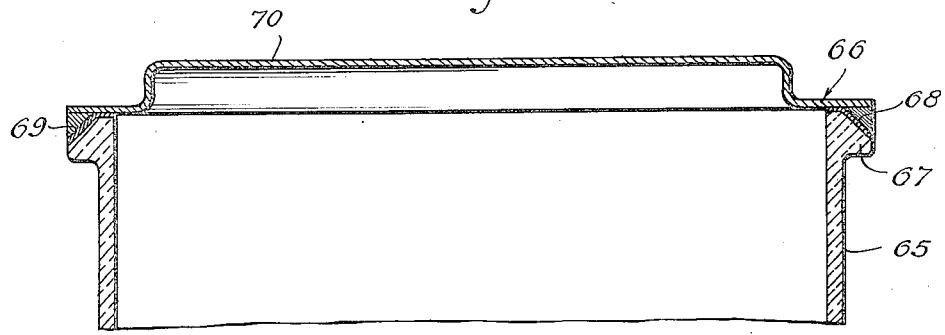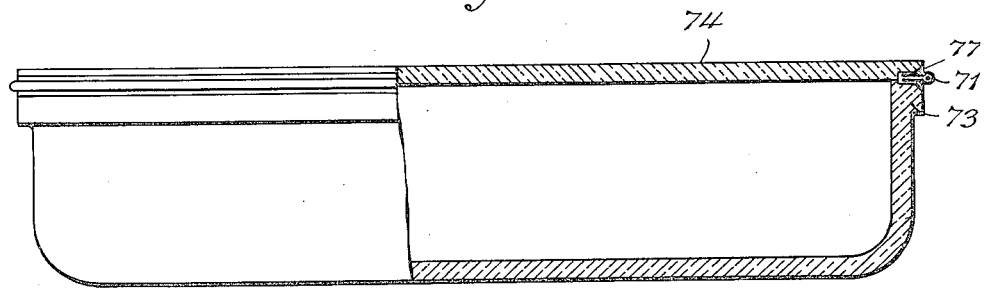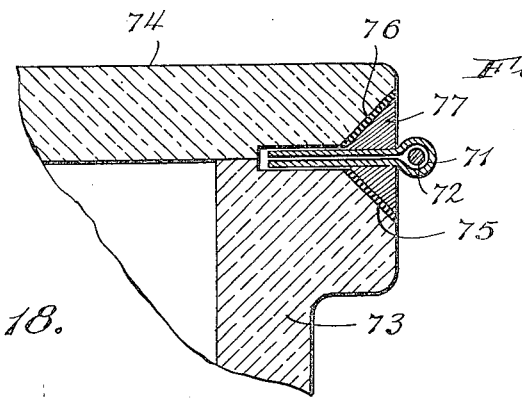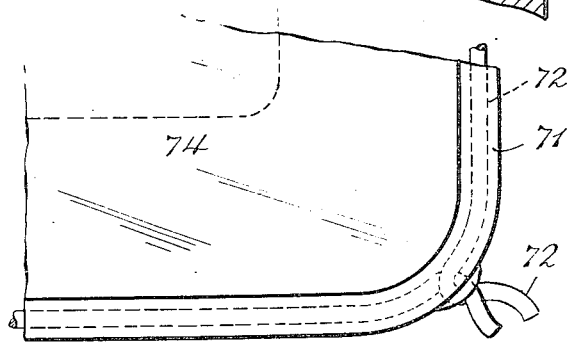
INVENTOR
BERNARD LONG

Patented Oct. 26, 1937

2,097,073

UNITED STATES PATENT OFFICE 2,097,073

TEMPERED GLASS ARTICLE AND METHOD OF MANUFACTURING THE SAME

Bernard Long, Paris, France, assignor to Societe Anonyme des Manufactures des Glaces & Produits Chimiques de Saint-Gobain, Chauny & Cirey, Paris, France Application June 29, 1935, Serial No. 28,987
In France July 2, 1934

11 Claims. (Cl. 49—81)

This invention relates to tempered or hardened glass and refers more particularly to various articles consisting of tempered glass or comprising certain portions which are made of such glass.

It is well known in the art, that articles which are made of tempered glass have a greater resistance to shock and to variations in temperature than articles which are made of ordinary glass. It was also noted, however, that such resistance is not uniform throughout the various portions of articles consisting of tempered glass. In the case of sheets or plates made of tempered glass, for instance, the edges of such sheets are broken much more easily than the middle portions thereof. The same is true as far as hollow objects made of tempered glass are concerned, such as glasses or containers. The edges of such containers or those portions of the containers the thickness of which varies to a considerable extent, are broken much more easily than the central or the bottom portions of such containers or glasses.

Furthermore, when articles consisting of tempered glass are broken they are separated into a very large number of small pieces, which are more or less scattered depending upon the violence of the shock which caused the breakage.

If articles consisting of separate pieces of glass were to be formed, it was customary in prior art to join these various pieces either by using resilient or elastic joints which were interposed between two glass pieces or by gluing the glass pieces together by means of various substances such as resins or tars.

It was found, however, that when two pieces of glass are joined together by a separate element or when they are glued together by any type of glue, this connection between the two glass pieces could not be maintained water-tight or air-tight for a considerable period of time. The reason for that is that the articles or substances interposed between two glass elements are subjected to various changes, such as heat, atmospheric conditions and the like. Furthermore when separate means are used for interconnecting two pieces of glass, such means must be maintained under pressure while the two glass pieces remain interconnected.

Pieces consisting of ordinary glass were also glued together by melting or softening adjacent portions of the two glass pieces and then by joining the softened portions of the two glass pieces. But this process cannot be applied to any kind of glass pieces particularly to pieces of great dimensions as such pieces must be annealed after they have been assembled together.

Moreover it is not possible to join two pieces of tempered glass by melting adjacent portions of said pieces, since tempered glass loses its hardness after it has been molten.

Furthermore, in some instances, for example, in the case of glass articles consisting of two or more portions separated by a hollow chamber, it is extremely difficult to join glass portions by melting adjacent parts thereof.

In certain cases, articles of tempered glass cannot be produced in a single piece of glass which is tempered afterwards, because the tempering is not possible either on account of the great dimensions of the article or on account of its complex form particularly when said article comprises inner closed cavities, the inner surfaces of which cannot be suddenly cooled. Such articles may only be obtained by uniting two or more glass elements which are separately manufactured and then tempered before being assembled.

An object of the present invention is the provision of articles made of or comprising tempered glass which have a uniform resistance throughout the various portions thereof against shocks, pressure or variations in temperature.

Another object is the provision of a method of interconnecting two or more elements made of tempered glass by means of which a durable, permanent and air- and water-tight connection between the glass pieces is attained.

A further object is the provision of articles comprising one or more parts made of tempered glass, which are permanently and firmly connected to the other parts of the same article.

It is thus possible according to the present invention to manufacture articles made of tempered glass having form and dimensions which render them difficult if not impossible to be produced by a single piece of tempered glass.

The above and other objects of the present invention may be realized by projecting and/or depositing a metallic layer upon some of the surfaces or portions of articles and/or parts consisting of tempered glass.

In such instances, where it is desired to strengthen the easily breakable portions of an article made of tempered glass, it is necessary to deposit a metallic layer closely adhering to the glass surface upon such portions of the glass articles which are easily breakable, have a lesser resistance and/or are more frequently exposed to shocks or variations in temperature than the other portions of the glass articles.

When two or more pieces consisting of tempered glass are to be joined together, this joining is carried out, in accordance with the present invention, by depositing closely adhering metallic layers upon adjacent surfaces of two or more pieces of glass. Then these metallic layers carried by the glass surfaces are joined together by soldering after having been brought in contact with each other.

When an article having very great dimensions or having a complex shape is to be manufactured this can be done by manufacturing separate elements, then tempering same individually and uniting them afterwards by coating their adjacent parts with a metallic layer and soldering such metallic layers.

Articles containing pieces made of tempered glass and also separate metallic pieces may be permanently interconnected by a process which comprises the steps of depositing metallic particles upon such surfaces or parts of the glass elements which are to be in contact with the metallic elements, and then soldering these metallic elements to the metallic layers carried by the glass elements.

The invention will appear more clearly from the following detailed description when taken in connection with the accompanying drawings showing by way of example preferred embodiments of the inventive idea.

In the drawings:

Figure 1 shows in front elevation a sheet of tempered glass which is reinforced by a metallic layer.

Figure 2 is a section along the line 2—2 of Fig. 1.

Figure 3 is a section through another glass plate provided with metallic layers.

Figure 4 illustrates a glass dish in side elevation.

Figure 5 shows a drinking glass.

Figure 6 shows a flask for laboratories.

Figure 7 illustrates a glass element which may be used as a part of a concrete structure for building and the like.

Figure 8 shows in a perspective view with a partial section a tank made of glass plates which have been joined together by soldering.

Figure 9 shows in section two interconnected hollow glass elements.

Figure 10 is a section through the glass element of a concrete structure.

Figure 11 is a perspective view of terminals adapted to convey an electrical current to an electrical resistance.

Figure 12 is a section through the device shown in Figure 11.

Figure 13 shows in front elevation the element of an electrical condenser.

Figure 14 is a perspective view of an electrical condenser.

Figure 15 is a vertical section through a glass container covered by a metallic cover.

Figure 16 is a section through a glass jar for preserves.

Figure 17 shows on a larger scale a portion of the jar illustrated in the Figure 16.

Figure 18 is a plan view illustrating a metallic piece carried by a glass element shown in Figures 16 and 17.

The article shown in Figs. 1 and 2 of the drawings consists of a plate 20 made of tempered glass the edges of which are covered by metallic layers 21. These metallic layers are deposited upon the glass surfaces by any suitable means or methods which are used in the art for this purpose. It is advisable to deposit the metallic particles upon the tempered glass surface by the method described in the co-pending patent application of Serial Number 733,454 filed July 2, 1934, since the method described in this patent application results in the production of coated glass articles, the hardness of which remains intact.

The sheet of glass 20 shown in Figs. 1 and 2 is coated in such manner that the metallic layers 21 form a frame upon both surfaces of the sheet 20.

Figure 3 illustrates a sheet 22 which is made of tempered glass. The edge surfaces of the sheet 22 are covered by a metallic layer 23.

Figure 4 illustrates a glass dish 24 provided with edges 25 which are coated by a metallic layer. The handle portions 26 and 27 of this glass dish as well as its bottom portion 28 are also covered by metallic particles.

Figure 5 shows a drinking glass 29 the upper borders 30 of which are coated by a metallic layer. The bottom portion 31 of the glass is also coated by a metallic layer. Due to this arrangement those portions of the glass 29 which break more easily than the other portions are effectively protected.

Figure 6 illustrates a flask 32 of the type generally employed for laboratory work. The top portion 33 of this flask and its bottom portion 34 are covered by metallic layers.

Figure 7 illustrates a glass element 35 of the type generally employed as a part of a concrete roofing or for other building purposes. The glass element 35 carries a metallic layer 36 upon its upper portion and is also provided with a metallic layer 37 deposited upon its lower portion. A third metallic layer 38 is situated substantially in the middle of the glass element 35. Due to this arrangement the resistance of the glass element 35 against shocks or variations in temperature is increased to a considerable extent.

In general, by depositing metallic layers upon weaker or thinner portions of glass articles or glass elements the total resistance of such elements against shocks, external forces or variations in temperature is increased to a considerable extent. A glass article, the weaker portions of which have been protected by a metallic layer has a uniform resistance which does not vary any more throughout the various portions of the article.

The metallic layers deposited upon the weaker portion of glass articles diminish the danger of breakage. However, should breakage occur, the metallic layers prevent small fragments of glass from scattering in all directions. A coated glass article which has become broken is not separated any more into many small fragments, since the metallic layers continue to connect the broken pieces to the main portion of the glass article.

The metallic coating serves, therefore, the double purpose of protecting glass from breakage, and of connecting the glass fragments should breakage occur.

Figure 8 illustrates a container which, if it is to be made of tempered glass, cannot be produced with safety, on account of its complex shape, with a single piece of glass and the method of interconnecting several glass plates of the type shown in Figs. 1 and 2 of the drawings. The horizontal glass plate 39, on which some bands are covered by a metallic coating 40 is connected to vertical glass plates 41 by any suitable soldering substance 42 of the type generally employed in the art. The edges of each of the vertical glass plates 41 which are to come in contact with the bands of the horizontal glass plate 39 and with the edges of the adjacent vertical glass plates are covered by a metallic coating 43.

When two plates such as 39 and 41 are to be connected with each other, they are placed together in such manner that the metallic layer 40 of the glass plate 39 rests upon the metallic layer 43 of the glass plate 41. Then the solder 42 is applied, which establishes a permanent airtight and water-tight connection between the two plates 39 and 41.

The article shown in Fig. 9 of the drawings comprises an upper glass element 44 and a lower glass element 45. The glass element 44 is provided with a metallic coating 46 while the glass element 45 carries a similar metallic coating 47. It is advisable to shape the two glass elements 44 and 45 in such manner that when they are placed together a hollow space or groove is formed which may be filled by any suitable solder 48.

The glass element shown in Fig. 10 is used in the building art as a part of a concrete roofing or for other similar purposes. This glass element 49 comprises edges which are covered by a metallic layer 50 and which are connected with a glass plate 51 by a solder 52 connecting the metallic layer 50 of the glass element 49 with the metallic layer 53 of the glass plate 51.

This example illustrates the possibility of producing by my process articles made of tempered glass having thicknesses varying to a great extent from one part to the other.

By soldering metallic layers carried by two glass surfaces it is possible to produce an article which is completely air-tight and water-tight and which has a great resistance against external forces or variations in temperature.

The metallic layers are deposited by projecting small particles of metals such as aluminium, zinc, lead, tin or the like upon the glass surfaces by any suitable means or methods. In many instances it was found advisable to deposit metallic particles in the form of a number of superposed layers.

Then the glass articles are arranged in such manner that the metallic layers of two glass elements are maintained in contact with each other. Finally a solder is applied which joins permanently the two contacting metallic surfaces of the glass elements. When applying the solder care should be taken that its temperature should not exceed 400° C. since a higher temperature would diminish the hardness of the tempered glass elements.

It is thus possible to manufacture articles of tempered glass which cannot be obtained by other methods such as articles comprising inner closed cavities because otherwise it is not possible to cool the inner surfaces of said cavities in order to temper them.

Figure 11 of the drawings illustrates an electrical heating resistance which is provided with terminals 54 and 55 adapted to be connected to any suitable source of electrical energy.

This electrical resistance comprises a plate 58 consisting of tempered glass and carrying metallic layers 56 and 57 deposited by projecting metallic particles upon the plate 58.

The terminal 54 comprises a round portion 59 while the terminal 55 is provided with a similar portion 60.

As shown more clearly in Figure 12, the terminals 54 and 55 are permanently connected to the metallic layers 56 and 57 by the solder 61. Preferably, the solder 61 should be a conductor of electricity, so that an electrical current can conveniently flow through the terminals toward the metallic layers carried by the plate 58.

Figure 13 illustrates the element of an electrical condenser. This element consists of a thin plate 62 made of a sheet of tempered glass. The plate 62 carries one or more metallic layers 63 deposited upon the side surfaces of this plate and constituting one of the armatures of the condenser.

A metallic plate 64 forming one of the terminals of the condenser is soldered to the metallic layer 63. The condenser shown in Figure 14 consists of a plurality of plates 62, each one of which is provided with a metallic terminal 64 soldered to the metallic layer carried by the glass plate 62.

Figure 15 illustrates another method of applying the subject matter of the present invention and shows a glass jar 65 which is to be hermetically closed by a metallic cover 66. The jar 65 is made of tempered glass and is provided with edges 67, which are covered by metallic layers 68.

After the cover 66 has been placed upon the edges 67 and the solder 69 is applied for providing a permanent air-tight connection between the jar 65 and the cover 66. The cover 66 is provided with a projecting portion 70, so that the jar may be easily opened by passing any suitable tool through the cover. It is possible to reverse this arrangement and to provide a metallic container which is soldered to portions consisting of tempered glass and covered by suitable metallic layers.

In many instances it is advisable to use such metals as aluminium or tin for coating the glass jars, particularly if these jars are to contain foodstuffs or the like.

The glass jar shown in Figures 16 to 18 of the drawings is provided with means which make it possible to easily open the jar. For that purpose there is provided a thin metallic strip 71 which is bent over and which contains a strong metallic thread 72.

The body portion of the container 73 is made of glass and the cover 74 of the container is also made of tempered glass. As shown more clearly in Figure 17, an edge of the container 73 is covered by a metallic layer 75 while the adjacent edge of the glass cover 74 is coated by a metallic layer 76.

The solder 77 fills in the spaces between the glass cover 74 and the strip 71. At the same time the solder 77 fills in the space between the strip 71 and the adjacent edge of the container 73.

The solder 77 provides a permanent air-tight connection between the container 73 and the cover 74; at the same time the container can be conveniently opened merely by pulling out the thread or wire 72 which tears apart the two bent over portions of the strip 71.

What is claimed is:

1. An article made of tempered glass comprising portions which have a lesser resistance or are more exposed to shocks and variations in temperature than other portions of the same article, the first-mentioned portions which consist of tempered glass being at least partly sprayed by metallic particles to form a closely adhering metallic layer.

2. An article comprising at least two adjacent tempered glass elements, those portions of any one of said elements, which are adjacent to another element being sprayed by metallic particles to form metallic layers, and a solder interconnecting said metallic layer.

3. An article, comprising at least one element made of tempered glass, at least one adjacent element made of metal, at least those surfaces of said tempered glass element which are adjacent to said metal element being covered by metallic layers, and a solder connecting said metallic layers with said metal elements.

4. The method of manufacturing articles made of tempered glass, which comprises the combination of steps of tempering a glass element, whereby certain portions of said element will have less resistance than other portions, and then projecting metallic particles upon those tempered portions which have the least resistance, at a temperature which will not affect the tempered state of said portions, whereby said portions of least resistance are coated by a metallic layer.

5. The method of manufacturing articles made of tempered glass, which comprises the combination of steps of tempering a glass element, whereby certain portions of the tempered glass element will be more exposed to shocks and variations in temperature than other portions, and then projecting metallic particles upon those tempered portions which are more exposed to shocks and variations in temperature at a temperature which will not affect the tempered state of said portions, whereby the last-mentioned portions are coated by a metallic layer.

6. The method of manufacturing articles made at least partly of tempered glass, which comprises the combination of steps of tempering a glass element, then depositing metallic particles upon at least a portion of the tempered glass element at a temperature which will not affect the tempered state of said portion, whereby said portion is coated by a metallic layer, and then soldering said metallic layer to another metallic surface at a temperature which will not affect the tempered state of said portion.

7. The method of manufacturing an article made of tempered glass, which comprises the combination of steps of tempering a glass element, tempering another separately manufactured glass element and then soldering said elements at a temperature which will not affect the tempered state of said glass elements.

8. The method of manufacturing an article made of tempered glass, which comprises the combination of steps of tempering a glass element, tempering another separately manufactured glass element, depositing metallic particles upon adjacent tempered parts of said glass elements at a temperature which will not affect the tempered state of said parts, whereby metallic layers are formed on said parts, and soldering said metallic layers at a temperature which will not affect the tempered state of said parts.

9. The method of manufacturing an article made of tempered glass, which comprises the combination of steps of tempering a glass element, tempering another separately manufactured glass element, depositing metallic particles upon certain tempered parts of said glass elements at a temperature which will not affect the tempered state of said parts, whereby metallic layers are formed on said parts, bringing the two metallic layers in contact with each other and then permanently joining the two contacting metallic layers by soldering said layers at a temperature which will not affect the tempered state of said elements.

10. The method of manufacturing articles which comprise elements made of metal and other elements consisting of tempered glass, said method comprising the combination of steps of tempering a glass element, said tempered glass element having a surface which is to be connected to a metal element, depositing metallic particles upon said surface at a temperature which will not affect the tempered state of said surface, whereby a metallic layer is formed covering said surface and then soldering said metallic layer with a metal element at a temperature which will not affect the tempered state of said glass element.

11. The method of manufacturing an article made of tempered glass, said method comprising the combination of steps of tempering a glass element, tempering another separately manufactured glass element, and then permanently uniting said tempered glass elements at a temperature which will not affect the tempered state of said glass elements.

BERNARD LONG.